United States Patent [19]

Bronstert et al.

[11] Patent Number: 5,321,093

[45] Date of Patent: Jun. 14, 1994

[54] LIVING POLYMERS, THE PREPARATION THEREOF AND THE USE THEREOF FOR PREPARING TELECHELIC POLYMERS

[75] Inventors: Klaus Bronstert, Carlsberg; Konrad Knoll, Mannheim; Erich Haedicke, Hirschberg, all of Fed. Rep. of Germany

[73] Assignee: BASF Aktiengesellschaft, Ludwigshafen, Fed. Rep. of Germany

[21] Appl. No.: 764,870

[22] Filed: Sep. 24, 1991

[30] Foreign Application Priority Data

Sep. 26, 1990 [DE] Fed. Rep. of Germany ....... 4030400

[51] Int. Cl.$^5$ .......................................... C08F 297/94
[52] U.S. Cl. .................... 525/314; 525/250; 525/267; 525/271; 525/366; 526/173
[58] Field of Search ............... 525/250, 267, 314, 271, 525/366; 526/173

[56] References Cited

U.S. PATENT DOCUMENTS

| | | | |
|---|---|---|---|
| 3,725,268 | 4/1973 | Gelblum et al. | 210/53 |
| 4,450,259 | 5/1984 | Roggero et al. | 526/173 |
| 4,580,407 | 4/1986 | Aime et al. | 62/148 |
| 4,678,837 | 7/1987 | Mancinelli | 525/314 |
| 4,686,263 | 8/1987 | Beck et al. | 525/314 |
| 4,874,821 | 10/1989 | Agostinis et al. | 525/314 |
| 4,891,410 | 1/1990 | Bronstert et al. | 525/314 |
| 4,918,142 | 4/1990 | Saito et al. | 525/314 |
| 4,960,842 | 10/1990 | Lo et al. | 585/314 |
| 5,003,010 | 3/1991 | Bronstert et al. | 525/314 |
| 5,070,148 | 12/1991 | Hsu et al. | 525/314 |
| 5,081,251 | 1/1992 | Bender | 564/434 |

FOREIGN PATENT DOCUMENTS 363659 9/1989 European Pat. Off.

*Primary Examiner*—John Kight, III
*Assistant Examiner*—P. Hampton-Hightower
*Attorney, Agent, or Firm*—Keil & Weinkauf

[57] ABSTRACT

A process for preparing bifunctional living polymers which are able to forth bifunctional telechelic polymers or block copolymers with at least 3 blocks of conjugated dienes and/or vinylaromatics with molecular weights of from 1,500 to 500,000, by bifunctional initiators whose anionic centers are aliphatic carbon atoms which are substituted by lithium and an aliphatic hydrocarbon radical as well as by either 2 aryl radicals or by one aryl radical and one hydrogen radical, where one of the aryl radicals can also be part of the two anionic centers, in a first stage being reacted in the presence of not more than 2.5 moles of an aliphatic ether or a tertiary amine per mole of lithium and not less than 2 mol/l of a conjugated diene at from −40° to +35° C. with not less than two moles of diene, resulting in the formation of low molecular weight diene oligomers which in turn act as bifunctional initiators, and using the latter in a second reaction stage in a conventional manner at above 40° C., with or without the addition of other monomers, to obtain polymers of the required molecular weight.

2 Claims, No Drawings

LIVING POLYMERS, THE PREPARATION THEREOF AND THE USE THEREOF FOR PREPARING TELECHELIC POLYMERS

The present invention relates to telechelic polymers, in particular from conjugated dienes, and to a process for the preparation thereof, and to block copolymers which contain at least 3 blocks. Telechelic polymers are functionalized at both ends of the molecule.

Ideal OH-terminated telechelic polydienes, e.g. particularly suitable as prepolymers for high-value polyurethane rubbers, ought, according to Schnecko et al., (Angewandte Makromolekulare Chemie 70 (1978), 10 (No. 1632)) to meet the following requirements:

$\alpha,\beta$-functionality: not less than 95% bifunctionality
glass transition: below 60° C.
microstructure: high, 1,4 configuration
molecular weight distribution: narrow ($\overline{Mw}/\overline{Mn}<1.3$)
molecular weight: 3000–10,000, preferably 3000–5000

The best method for obtaining functionalized polydienes with such a narrow distribution and sufficient stability with essentially bifunctional substitution is regarded as being anionic polymerization with bifunctional initiators which are soluble in hydrocarbons.

Many bifunctional initiators are known. A summary is given by, inter alia, Schnecko et al. (see above), D. M. French, Rubber Chemistry and Technology 42 (1969), 71 and Morton, Fetters et al., Rubber Chemistry and Technology 49 (1976), 303. However, without exception they do not meet the above requirements.

Since many of the described initiators are insoluble in hydrocarbons, the polymerization is often carried out in two stages (GB-A-972 246). In the first stage, an oligomeric prepolymer which is soluble in hydrocarbons is prepared from a diene by reaction with lithium in the presence of methylnaphthalene or stilbene, for example in diethyl ether or another polar solvent, at $-26°$ C. in 40 h. After addition of a hydrocarbon, the polymerization is then completed with further diene in a second stage, generally after removal of the polar solvent by distillation.

The distillation is difficult because of the high viscosity of the solution. Part of the activity is lost, and the ether cannot be removed completely. Morton and Fetters (see above) therefore use triethylamine or anisole, which is not removed by distillation before the second polymerization stage. However, the resulting telechelic polymers have too high a content of monofunctional oligomers and too high a proportion of monomers incorporated in the 1,2 or 3,4 configuration, i.e. short-chain branches.

Monofunctional byproducts are also formed on use of certain initiators which are readily soluble without modification in hydrocarbons, as are described, inter alia, in U.S. Pat. No. 3,725,268, U.S. Pat. No. 3,787,510, Macromol. Chem. 184 (1983) 1833- 99, U.S. Pat. No. 4,580,407 and U.S. Pat. No. 4,450,259. If polymerization is carried out with initiators of this type, which are intrinsically very stable, e.g. butadiene in pure hydrocarbon, there is partly monofunctional growth of the resulting polymers. This indicates, as does the broad (called tailing) and frequently bimodal molecular weight distribution to be seen on the GPC diagram, that there is hindrance to initiation. These manifestations can be partly avoided in the presence of small amounts of ether or THF, but then there is found to be short-chain branching, is an increased proportion of monomers incorporated in the 1,2 or 3,4 configuration.

It is an object of the present invention to provide a process with which it is possible to prepare telechelic polydienes with high functionality, a low content of short-chain branches and a narrow molecular weight distribution in hydrocarbons in the presence or absence of polar solvents.

We have found that this object is achieved by obtaining bifunctional living polymers which are able to form telechelic polymers by a bifunctional initiator whose anionic centers are aliphatic carbon atoms which are substituted by lithium and an aliphatic hydrocarbon radical as well as by either 2 aryl radicals or one aryl radical and one hydrogen radical, where one of the aryl radicals can also be part of the two anionic centers, in a first stage being reacted without or with the presence of not more than 2.5 moles, but preferably less than 0.5 mole, of a polar solvent per mole of lithium and not less than 2 mol/l, preferably more than 6 mol/l or 50% by volume, of a conjugated diene at from $-40°$ C. to $+35°$ C. with not less than 2 moles of diene, resulting in the formation of low molecular weight diene oligomers which in turn act as bifunctional initiators, and using the latter in a second stage, preferably after dilution with inert hydrocarbons, to obtain polymers of the required molecular weight in a conventional manner at from 40° C. to 100° C., preferably from 50° to 70° C., with or without the addition of other monomers.

The resulting living polymers can be converted with conventional functionalizing reagents into telechelic polymers.

Examples of aryl radicals in the initiator are: phenyl, naphthyl, biphenylyl or pyridyl, and derivatives thereof substituted by not more than 4 alkyl, alkoxy, phenoxy or tertiary amino groups per aromatic nucleus. Particularly suitable aryl radicals have 1–4 alkyl groups but either the 1 or the 5 position must not be substituted.

Suitable bifunctional initiators soluble in hydrocarbons are described in DE-A-880 222, DE-A-57 29 144 and the not prior-published German Patent Application P 3921140. Other compounds are described hereinafter. Bifunctional initiators are prepared, for example, by dimerization of $\beta$-alkylstyrenes or of alkylated 1,1-diphenylethylenes with metallic lithium or by a metalation of nuclear-alkylated stilbenes with lithium metal in the presence of not less than 2 moles of a polar solvent per mole of olefin, preferably in the presence of aliphatic ethers and/or tertiary amines. The procedure for this is expediently as follows:

The required olefinically unsaturated compounds are, expediently under inert gas, metalated with an excess of lithium either in diethyl ether or in a solvent which contains not less than 2 to 3 moles of ether per mole of required product (the remainder composed of, for example, an aromatic compound such as toluene or benzene) at 15°–30° C.; the ether is then generally removed by distillation under reduced pressure.

The solutions obtained after concentration are oily, are deep greenish black or blackish brown depending on the aryl radical and contain about 50–90% by weight or 1.5–2 mol/l and are used in this form for the subsequent reaction. They generally contain not more than 0.3 mole of ether per mole of bound lithium. This residual ether can, if necessary, be reduced to less than 0.1 mole of ether per mole of lithium by fractional distillation.

If the added hydrocarbon is also almost completely removed again, then the catalyst is in a plastic or crystalline, highly concentrated form which becomes liquid again on incorporation of a diene. It is preferable to use initiators which are not in crystalline form.

The following relates to the selection of suitable initiators:

Initiators from metalated stilbenes or dimerized derivatives of 1,1-diphenylethylene generally give a higher yield of bifunctionality than those from β-alkylstyrenes on reaction with diene. The nuclear-alkylated derivatives of all the classes of compounds are more effective than the non-alkylated substances.

The initiator from 1,1-diphenylethylene itself can, because of its poor solubility, be used only in the presence of 2–2.5 moles of ether per mole of lithium content.

It is, of course, possible to use mixtures of various aromatic olefins to prepare the bifunctional starting initiators. This may be worthwhile, for example, if an initiator is prone to crystallization or is not soluble on its own in hydrocarbons. These disadvantages can be overcome by suitable codimerization. It is even possible with suitable partners to obtain catalysts soluble in hydrocarbons from 1,1-diphenylethylene.

When metalated alkylated stilbenes are used as initiators, the polymerization is predominantly initiated by transfer of the lithium to the monomers. The stilbenes are therefore present in the finished telechelic polymer.

In the procedure which is preferred according to the invention, the first stage (oligomerization) is carried out in pure monomer. However, the amount of monomer reacted in this stage should not exceed that necessary for activation of the initiators, because a higher proportion of the diene is incorporated with the 1,2 configuration into the polymers at low temperature than at the higher temperature which should prevail in the second stage.

The monomers preferably used for the first stage are butadiene or isoprene. Styrene generally reacts too rapidly so that there is a tendency for the reaction to go to completion. On the other hand, a mixture of, for example, 50% styrene with diene can be used satisfactorily.

In principle, 1 mole of diene per mole of initiator is sufficient to prepare the oligomers which are soluble in hydrocarbons; however, in practice, because of the competing polymerization, on average more than 4 moles of diene per mole of initiator are required for complete reaction of all initiator molecules. A good indication of complete activation of the initiator is the disappearance of its intense color as a consequence of the conversion of the benzyl or diarylmethyl anions into less deeply colored dienyl anions. In practice, the color changes from deep brownish black or greenish black to pale orange or yellow within 5–60 minutes, depending on the reaction conditions.

The invention differs from the prior art in that nuclear-alkylated bifunctional initiators which are prepared aromatic olefins, are essentially ether-free and are soluble in hydrocarbons are reacted in a first stage at very low concentration or absence of polar solvent and at high monomer concentration to essentially bifunctional prepolymers, i.e. oligomers. By contrast, in this stage the known processes use initiators which have low solubility in hydrocarbons in concentrated or pure polar solvent at low diene concentration, with the diene being added in portions or slowly and continuously because of the high reaction rate under these conditions. The process according to the invention can, by contrast, be carried out without solvent in pure monomer. Even at the highest initiator concentration the reaction is easy to control.

The process according to the invention dispenses with the elaborate removal, which is necessary in the prior art after the first polymerization stage, of the ether from the highly viscous solution of the prepolymer, which cannot be achieved completely.

The process according to the invention can be applied, with the abovementioned restriction, to all monomers which are conventionally used for anionic polymerization in hydrocarbons. These are, in particular, conjugated dienes and vinylaromatics, e.g. butadiene, isoprene, 3,4-dimethylbutadiene, 1-methylbutadiene, styrene, nuclear-alkylated styrenes such as p-methylstyrene, o,p-dimethylstyrene and, in the second reaction stage, α-methylstyrene. This is an exemplary list and is not meant to imply a restriction.

The use of a readily soluble initiator prepared from aromatic olefins in conjunction with a two-stage polymerization in which the initiators are activated in the first stage at low ether and high diene concentration in the process according to the invention provides telechelic polymers which, compared with the prior art, have a very narrow molecular weight distribution, high functionality and high content of 1,4 configuration. The resulting telechelic polymers contain more than 90%, preferably more than 95%, bifunctional oligomers, have a molecular weight distribution $\overline{M}_w/\overline{M}_n$ of below 1.1 and contain less than 40%, preferably less than 25%, short-chain branches, it being possible to reduce this content to about 9–12% as the molecular weight of the polymers increases.

All the operations required for preparing the telechelic polymers must, as usual when using organometallic compounds, be carried out with strict exclusion of oxygen and moisture. The solvents and monomers are purified before use, e.g. by distillation over calcium hydride or alkylaluminum.

It is also possible to prepare by the process according to the invention block copolymers in fewer stages than when monofunctional initiators are used. For example, successive polymerization of butadiene and styrene results, in 2 hours, in 3-block copolymers whose properties correspond to polymers of the same composition prepared, for example, by known methods in a 3-stage polymerization (styrene ⊖ butadiene ⊖ styrene) with a monofunctional catalyst. The polystyrene blocks remaining after oxidative degradation of the polybutadiene part of the block copolymers with osmium tetroxide (cf. Angew. Makromol. Chem. 26 (1972) 207) have the same molecular weight in both polymerization methods.

S → Bu → S 3-block copolymers prepared according to the invention, in contrast to those prepared by coupling living 2-block copolymers, contain no 2-block copolymers and therefore have a particularly good profile of properties.

The viscosity of living polymer solutions prepared according to the invention is higher, for the same molecular weight, than that of living polymers prepared with monofunctional initiators, because the chain ends form a reversible physical network by association. The viscosity is highest in hydrocarbons. It is increased by converting the carbanionic end groups with terminating reagents into, for example, lithium carboxylic, lithium amide, lithium alcoholate or lithium thiolate end groups to such an extent that even with a low polymer concentration and molecular weight there is found to be formation of an aspic-like gel. It is therefore necessary, in order to achieve complete conversion, to mix thoroughly with an appropriate stirring energy and high torque. It is advantageous, in the interest of high functionality, to carry out the termination at low viscosity or not too high a concentration, e.g. a solids content of 6–10%. Addition of water, alcohol or other compounds containing active hydrogen to the resulting gel reduces the viscosity by several orders of magnitude, and the solution becomes mobile.

The termination yield is very high when mixing is thorough. Good telechelic polybutadienes contain more than 95 to more than 99% by weight of bifunctional oligomers when the molecular weight is, for example, from 5000 to 10,000. The remainder is composed of monofunctional and a little non-functional polybutadiene.

Methods for functionalizing living chain ends are known. Examples of suitable functionalizing reagents are oxiranes which result in terminal primary or secondary hydroxyl groups (cf. U.S. Pat. No. 3,786,116), or thiiranes, which can be used to introduce terminal mercapto groups. The methods of EP-A-211 395 or EP-A-244 603 can be used to obtain polymers which contain at least one amino group at the chain end. The reactions have been described in detail, but they are also to be found in the examples which follow.

The resulting polymers which have been wholly or partly produced from dienes can be hydrogenated. Hydrogenation with molecular hydrogen and suitable catalysts is described, for example, in U.S. Pat. No. 3,113,986, DE-A-1 222 266, DE-A-2 013 263, DE-A-1 106 961 and DE-A-1 595 345.

Polymers prepared by the process according to the invention and functionalized with mercapto, hydroxyl or amino groups at both chain ends can be used, in particular, as prepolymers for polyurethanes, epoxy resins or for the modification thereof, inter alia.

The preparation of, for example, epoxy resins or elastomeric polyurethanes from a hard segment composed of aromatic polyisocyanates and a soft segment composed of functionalized flexible macromolecules is described, for example, by H. P. Elias, Makromoleküle, pages 778 to 780 and 809 to 812 (1981) Hüttig und Wepf Verlag, Basle-Heidelberg-New York and the literature cited therein.

Functionalized polymers which contain amino or hydroxyl groups at the chain ends can be crosslinked with, for example, diisocyanates and other reagents. Solutions of such polybutadienes mixed with diisocyanates, poured onto silicone-coated paper and dried give, in the case of polymers composed predominantly of dienes, elastic dry films which are insoluble in hydrocarbons and which can be pulled off the substrate and display high reversible extensibility.

Polybutadiene diols display as soft segments in thermoplastic polyurethanes particularly extensive demixing of the hard and soft segments, which is unwanted for applicational and processing reasons, as has been described by Becker and Braun, Kunststoffhandbuch, volume 7, Polyurethanes, page 33 (1983), 2nd edition, Hander Verlag, Munich-Vienna.

At the same weight average molecular weight ($M_w$) the telechelic diols prepared according to the invention have, because of their narrow molecular weight distribution, a lower viscosity than known prepolymers such as telechelic polybutadienes, polytetrahydrofuran or polyesters prepared by free radical processes. They can therefore be processed more easily.

Telechelic polymers obtained by the process according to the invention can have a weight average molecular weight ($M_w$) of, for example, from 1500 to 500,000, preferably 3000 to 130,000, determined by gel permeation chromatography (GPC) comparing with standard polymers suitable for calibration (cf. G. Glöckner, "Polymercharakterisierung dutch Flüssigkeitschromatographie", Verlag A. Hüthig, Heidelberg (1982)).

The standard method entails measurement in 0.25% strength tetrahydrofuran solution at 23° C. with a flow rate of 1.2 ml/min. The molecular weight is expediently determined before functionalization because some functionalized polymers are irreversibly adsorbed by GPC columns and make them unusable.

The polymers are worked up in a conventional manner, e.g. by precipitation with a nonsolvent, by evaporating off the solvent or by steam distillation. It is also possible to degas in a degassing extruder.

Initiators composed of the following initial olefins were used in the examples:

I: 1,1-Diphenylethylene (molecular weight 180)

II: m,p,m',p'-Tetramethyl-1,1-diphenylethylene (molecular weight 236)

III: $\beta$-Isooctylstyrene (molecular weight 216)

IV: p-Isopropyl-$\beta$-n-heptylstyrene (molecular weight 244)

V: m,p-Dimethyl-$\beta$-ethylstyrene (molecular weight 160)

VI: m,m,p-Trimethyl-$\beta$-ethylstyrene (molecular weight 174)

VII: 4-t-Butyl-4'-(2-hexadecyl)-trans-stilbene (molecular weight 460)

The solvents (cyclohexane, methylcyclohexane, heptane, diethyl ether) were purified by distillation over butyllithium.

Nitrogen was passed though a mixture of white oil, 1% by weight styrene and 5% by weight butyllithium.

Lithium was used in the form of 1 to 5 mm granules supplied by Merck-Schuchardt.

The polymerization experiments were carried out with commercial butadiene, dimethylbutadiene, isoprene and styrene. Before use, the monomers were purified by distillation after adding 0.5% by weight triisobutylaluminum.

Commercial ethylene oxide was used for the functionalization and was obtained from a cylinder and distilled over triisobutylaluminum. Purified benzanilide was also used for termination.

Characterization of the Initiators and Polymers According to the Invention

Determination of the Polymerization Activity (PA)

The PA is defined as the content of polymerization-active lithium. Thus, 1 mole of bifunctional initiator corresponds to 2 moles of PA.

A calibrated 5 ml disposable polypropylene syringe fitted with a 15-cm long needle is used to remove, under inert conditions (impurities are removed from the syringe by aspirating and discharging the reaction solution several times), an amount of solution containing about 2 to 3 mmol of PA from the reactor or the storage vessel and introduce it through a rubber cap into a 250 cm³ flask which contains 100 ml of toluene and a stirrer bar and is flushed with pure nitrogen. Impurities in the toluene have previously been removed by titration with the reaction solution till the color is pale yellow. The intensely colored solution is then titrated with 1N isopropanol in absolute toluene from a 5 cm³ calibrated syringe until colorless. The total amount of PA in the reactor is then calculated from $$\frac{\text{initial amount} + \text{amount removed (cm}^3)}{\text{cm}^3 \text{ removed}} \times$$

$$\text{cm}^3 \text{ of } 1 \, N \text{ isopropanol} = \text{mmol of PA}$$

Determination of the Alkali Content

An amount of initiator solution corresponding to about 1 mmol of PA is removed as described in a) and introduced under nitrogen into a mixture of 10 cm³ of cyclohexane and 1 cm³ of methanol. The colorless mixture is then extracted by shaking with 20 cm³ of distilled water. After settling, the clear aqueous extract is removed with a syringe, and the solution is extracted twice more with 10 cm³ of water each time. The combined extracts are boiled in an Erleruneyer flask until all the organic solvent has been removed. After cooling, titration is carried out with N/10 HCl and phenolphthalein.

$$\frac{\text{Initial amount} + \text{amount removed (cm}^3)}{\text{cm}^3 \text{ removed} \times 10} \times$$

$$\text{cm}^3 \text{ of } N/10 \text{ HCl} = \text{mmol of alkali}$$

Determination of the Ether or Tertiary Amine Contained in the Initiator 5 cm³ of the initiator solution which contain about 1 to 3 mmol of PA are titrated, in a 25 cm³ distillation flask under nitrogen, to decolorization with X cm³ of a solution of 1N isopropanol in toluene. All the solvent is then driven over into a receiver cooled in a methanol/dry ice mixture and the content of ether or amines in the distillate is determined in % by weight by gas chromatography. A Shimadzu GC-2BT gas chromatograph with a Carbowax 20M column at 60° C. was used.

The molar ratio of ether (or polar solvent) to polymerization activity (PA) is calculated from $$\frac{\% \text{ by weight ether} \times (5 + X) \, (\text{cm}^3)}{\text{mmol of PA} \times 7.2} = \frac{\text{mol of ether}}{\text{PA}}$$

Determination of the Molecular Weight and its Distribution by GPC

The non-functionalized samples were used for the analysis. A Waters GPC apparatus was used for measurement. The molecular weights were determined by comparison with standard polymers suitable for calibration (cf. G. Glöckner, "Polymercharakterisierung dutch Flüssigkeitschromatographie", Verlag H. Hüthig, Heidelberg, 1982). Measurements were carried out on the 0.25% strength solution in THF at 23° C. with a flow rate of 1.2 cm³/min. The number average and weight average molecular weights $\overline{M_n}$ and $\overline{M_w}$ were determined and, from these, Mw/Mn as a measure of the heterogeneity. Used for this purpose was a computer program developed by Polymer Standard Services, Mainz, FRG.

The arithmetic mean, corresponding to the composition, of the molecular weights from the calibration plots of the two homopolymers were used empirically as a basis of the molecular weight of the (block) copolymers.

Determination of the Nitrogen Content

The total nitrogen content was determined by the Kjeldahl method.

Determination of the Functionality of OH-terminated Telechelic Polymers by HPLC Since calculation of the functionality from the molecular weight and OH or amine number gives only an inaccurate statistical average, the content of oligomers with various functionalities in the telechelic polymers was determined by HPLC analysis.

The telechelic polymers were separated under the following conditions into non-functional, monofunctional and bifunctional fractions:

column: Li-Chrosorb CN (5 µm), supplied by Merck, Darmstadt,
solvents: A=cyclohexane; B=methylene chloride
gradient: 100% A → 30 min. 58% B + 42% A
flow rate: 1 ml/min
detector: mass detector supplied by Zinsser Analytik, Frankfurt, Model 750/14.

The clearly separated areas for the three components were evaluated, the first being that for the non-functionalized fraction, followed by the monofunctional fraction and finally the bifunctional polymer. The OH number was determined by a modification of the DIN 53 240 method using phthalic anhydride, adding 30 cm³ of n-heptane after the reaction (before the titration).

EXAMPLES 1-3

These examples show how the functionality of an OH-terminated telechelic polybutadiene can be increased by high monomer concentrations during initiation.

Preparation of the Initiator

The following are placed, in the stated sequence, in a 50 cm³ two-neck flask which is equipped with a stirrer bar and thermometer and is flushed with pure nitrogen:
2 g of lithium granules
9.74 g (40 mmol) of olefin II and
10.5 cm³ (7.5 g=100 mmol) of diethyl ether.

The open arm is closed with a rubber cap. The reaction starts immediately on vigorous stirring and cooling with water at 25° C., the color changing to brownish orange, and is complete after one hour. 21 cm³ of reaction solution contain 20 mmol of bifunctional initiator.

Procedure According to the Invention

The reactor used for both reaction stages is a 500 cm³ round-bottomed flask which is equipped with a powerful wall-sweeping stirrer with a Teflon blade, a calibrated receiver cooled with methanol/dry ice for liquid butadiene, another receiver for methylcyclohexane and a temperature measuring device. The reactor is operated under a blanket of pure nitrogen. All the components of the reactor are washed with methylcyclohexane containing 1% butyllithium before the experiments are carried out.

The butadiene receiver is charged with 20 g (about 31.5 cm$^3$) of pure butadiene, and the second receiver is charged with 320 cm$^3$ of methylcyclohexane. The reactor is cooled to −10° C. and charged from the receivers with 20 cm$^3$ of methylcyclohexane and with 3 or 6 or 9 cm$^3$ of butadiene for Example 1 or 2 or 3. 4.2 cm$^3$=4 mmol of catalyst solution in each case are injected using a polypropylene syringe through a rubber cap closing the side arm (stage 1). After 30 minutes, the viscous solution is diluted with 50 cm$^3$ of methylcyclohexane and heated to 65° C. After removal of a 1 cm$^3$ sample, the remaining solvent and butadiene are added at this temperature so that only slight refluxing occurs (stage 2). Polymerization is then continued for 30 minutes, and the highly viscous solution is cooled to 30° C. At this temperature, and while stirring vigorously, 10 cm$^3$ of a 1 molar solution of ethylene oxide in methylcyclohexane is injected using a polypropylene syringe through the rubber cap into the solution. The solution becomes an aspic-like mass after a few seconds, and this is converted into a thick paste on continuing the vigorous stirring. After 60 minutes, a few drops of methanol are added and the now mobile solution is poured into 1000 cm$^3$ of vigorously stirred ethanol. The mixture is allowed to settle, the upper layer is poured off and the remaining oil is washed 2 × with 300 cm$^3$ of ethanol each time, stirring vigorously. The oil is then stirred with about 20 mg of ®Irganox 1076 (stabilizer from Ciba-Geigy AG, Basle) and dried in a vacuum oven at 70° C. The analytical data on the experiments are shown in Table 1.

EXAMPLES 4 AND 5

The process is carried out as described above but an initiator prepared from III (β-isooctylstyrene) is used. In the first stage of the polymerization three 3 cm$^3$ portions of butadiene were added at 15-minute intervals in Example 4 while 9 cm$^3$ of butadiene were added all at once in Example 5. The analytical data are to be found in Table 1.

EXAMPLE 6

The procedure is similar to that of Example 3 but using a catalyst from the olefin IV. The analytical data are to be found in Table 1.

EXAMPLE 7

The procedure is similar to that of Example 3 but using a catalyst from 1,1-diphenylethylene (I). The catalyst initially precipitates on addition but gradually dissolves over the course of 45 minutes. The analytical data are to be found in Table 1.

It is evident from Examples 1, 2 and 3 that the bifunctional oligomer content in the telechelic polymers increases rapidly with the butadiene concentration in the 1st stage, and that the molecular weight distribution becomes narrower.

It is evident from Examples 4 and 5 that, for the same total conversion, the experiment with the higher diene concentration according to the invention in the first stage of the polymerization gives the higher bifunctional oligomer content in the telechelic polymers.

Comparison of Experiments 5 and 6 with 7 and 3 shows that initiators from derivatives substituted by alkyl groups on the aromatic nuclei give higher yields of bifunctional oligomers than do those from the unsubstituted substances.

EXAMPLES 8, 9, 10, 12 AND 13

The following examples make use of essentially ether-free initiators which were dissolved in pure dienes.

Description of Experiments 6 mmol of tetramethyldiphenylethylene or the other olefins listed in Tab. 2 are reacted with 2 g of metallic lithium in 20 cm$^3$ of diethyl ether under nitrogen to give the corresponding bifunctional initiator. The deep-colored solution is then transferred with a polypropylene syringe into the 500 cm$^3$ round-bottomed reaction flask of Example 1. The lithium is washed 2 × with 10 cm$^3$ of toluene each time. The washings are likewise transferred into the 500 cm$^3$ flask. The ether and most of the toluene are stripped off under reduced pressure, finally heating the flask in a water bath at 30° C. The catalyst is distributed as a thin oily layer on the wall of the flask by the stirrer.

The flask is cooled with a salt/ice mixture to −10° C. and then 24 cm$^3$ of butadiene are added, from the receiver which contains 30 g =47 cm$^3$, which dissolves the catalyst. After one hour at this temperature the solution has become almost colorless. 25 cm$^3$ of cyclohexane are then added, and the mixture is heated to 60° C., when most of the butadiene distils back into the receiver.

All the butadiene is run, together with 200 cm$^3$ of heptane and 25 cm$^3$ of cyclohexane, at this temperature into the reactor over the course of 2 hours so that there is little refluxing. Polymerization is completed in a further 30 minutes, resulting in a highly viscous solution. It is then cooled to 30° C. and, while stirring vigorously, 12 cm$^3$ of a 1 molar solution of ethylene oxide in cyclohexane is added from a polypropylene syringe. The solution solidifies within 10 sec to a gel which is gradually converted into a thick paste. After standing overnight, the reaction is stopped with a few drops of methanol and the solution is poured into 1000 cm$^3$ of vigor-

TABLE 1

Dependence of the properties of OH-terminated telechelic polymers on the butadiene concentration in the 1st stage of polymerization and on the type of catalyst.

| Example | Initiator | Stage 1 Butadiene concentration | | Polymer configuration | | | | $\overline{Mn} \times 10^{-3}$ | $\overline{Mw}/\overline{Mn}$ | Oligomer content F = 2% by wt. |
|---|---|---|---|---|---|---|---|---|---|---|
| | | mol/l | % by vol. | Prepolym. | | Final prod. | | | | |
| 1 | II | 1.3 | 11 | 34 | 66 | 69 | 31 | | 1.75 | 73 |
| 2 | II | 2.4 | 21 | 33 | 67 | 68 | 32 | | 1.18 | 97 |
| 3 | II | 3.2 | 28 | — | — | 66 | 34 | | 1.09 | 99 |
| 4 | III | 1.3 (3×) | 11 | 33 | 67 | 67 | 33 | | 1.09 | 86 |
| 5 | III | 4.0 | 36 | — | — | 69 | 31 | | 1.08 | 91 |
| 6 | IV | 4.0 | 35 | 28 | 72 | 63 | 35 | | 1.1 | 96 |
| 7 | I | 3.2 | 28 | — | — | 61 | 39 | | 1.08 | 96 | ously stirred ethanol. The telechelic polymer separates out as an oil. After decantation, it is stirred 2 × with 500 cm³ of ethanol each time. The oil is separated off and stabilized with 200 mg of Irganox 1076 (proprietary name of Ciba-Geigy, Basle) and volatiles are removed under high vacuum at 120° C.

The termination in Example 13 was carried out with benzylideneaniline

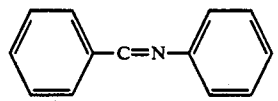

in which case there was only an increase in viscosity, no gel formation. Thus mixing was not difficult, and the extent of termination was particularly high, which is evident from the low content of non-functionalized oligomers. The nitrogen content determined by the Kjeldahl method was 0.44%.

The analytical data for these examples are shown in Table 2.

EXAMPLES 11, 14, 15, 16 AND 17

In these examples a butadiene was replaced by isoprene or dimethylbutadiene. The catalysts were dissolved, and the first polymerization stage was carried out, at room temperature. The analytical data are likewise shown in Table 2.

Mixtures of initial olefins were used in Examples 9-16 in order to suppress the tendency of catalysts prepared from pure 3,4,3',4'-tetramethyldiphenylethylene, 3,4-dimethyl-β-ethylstyrene and 3,4,5-trimethyl-β-ethylstyrene to crystallize.

Particularly good results were achieved in the preparation of telechelic polyisoprenes, apart from Example 11. This is due, in particular, to the initiators dissolving more quickly in the monomer at room temperature, this taking place very slowly when butadiene is used, because of its boiling point of −5° C.

We claim:

1. A process for preparing bifunctional telechelic polymers or block copolymers selected from the group consisting of polymers of a conjugated diene and a vinylaromatic monomer with a molecular weight of from 1,500 to 500,000 which process comprises reacting in a first stage a bifunctional initiator selected from the group consisting of lithiated dimerized β-alkylstyrenes, lithiated dimerized alkylated 1,1-diphenylethylenes and nuclear alkylated stilbenes in the presence of not more than 2.5 moles of an aliphatic ether or a tertiary amine per mole of lithium with not less than two moles of a conjugated diene in a concentration of not less than 2 mol/l of said diene at from −40° to +35° C. whereby a living diene oligomer is formed and reacting the oligomer with at least one first monomer to form a living polymer having a molecular weight of from 3,000 to

TABLE 2

Dependence of the properties of OH-terminated telechelic polymers on the butadiene concentration in the 1st stage of the polymerization and on the type of catalyst.

| Example | Initiator composition mmol % | Monomer | End group | N content | Polymer configuration 1,4 | 1,2 | 3,4 | $\overline{Mn} \times 10^{-3}$ | $\overline{Mw}/\overline{Mn}$ | % by wt. oligomer with F = 23378 F/O | 1 | 1 | OH number |
|---|---|---|---|---|---|---|---|---|---|---|---|---|---|
| 8 | II | Bu | —OH | — | 76 | 26 | — | 6.35 | 1.07 | 2.0 | 3.0 | 95.0 | 18.2 |
| 9 | 70 V/30 IV | Bu | —OH | — | 76 | 24 | — | 5.3 | 1.05 | 1.5 | 4.5 | 94.0 | 20 |
| 10 | 70 VI/30 IV | Bu | —OH | — | — | — | — | 5.4 | 1.05 | 1.1 | 6.9 | 92.0 | 20.4 |
| 11 | III | Is | —OH | — | — | — | — | 4.7 | 1.1 | 1.0 | 11.0 | 88.0 | 23.0 |
| 12 | 80 II/20 I | Bu | —OH | — | 78.4 | 21.6 | — | 5.8 | 1.05 | 0.4 | 1.1 | 98.5 | 20.5 |
| 13 | 80 II/20 I | Bu | —NH—⌬ | 0.59 | — | — | — | 5.9 | 1.06 | 0.2 | 1.0 | 98.8 | 20.2 |
| 14 | 70 V/30 IV | Is | —OH | — | 87.1 | — | 12.9 | 6.2 | 1.08 | 0.5 | 5.0 | 94.5 | 19.0 |
| 15 | 70 IV/30 IV | Is | —OH | — | — | — | — | 6.1 | 1.1 | 0.5 | 4.0 | 95.5 | 18.9 |
| 16 | 80 II/20 I | DMBu | —OH | — | — | — | — | 5.6* | 1.35 | 9.0 | 19.0 | 72.0 | — |
| 17 | VII | Is | —OH | — | 88.6 | — | 11.4 | 6.0 | 1.09 | 1.0 | 4.0 | 95.0 | 19.2 |

Bu = butadiene
Is = isoprene
DMBu = 2,3-dimethylbutadiene
*determined from a polybutadiene calibration plot An initiator prepared from β-isooctylstyrene was used in Example 11. A lower yield of bifunctional telechelic polymer is obtained with this, because the aromatic nucleus is not alkylated, like Example 6 too.

A very good result was achieved in Example 17 using a catalyst from stilbene alkylated in both nuclei.

10,000, and the living polymer so obtained is reacted either directly of after polymerizing with a monomer different from said first monomer with a functionalizing reagent into a telechelic polymer.

2. A process as claimed in claim 1, wherein butadiene or isoprene is used as monomer in the first stage.

* * * * *